United States Patent [19]
Sannwald

[11] Patent Number: 5,755,132
[45] Date of Patent: May 26, 1998

[54] PUNCHING AND FORMING TOOL

[75] Inventor: Heinz Sannwald, Schwaigern, Germany

[73] Assignee: Karl Marbach GmbH & Co., Germany

[21] Appl. No.: 797,747

[22] Filed: Feb. 7, 1997

[51] Int. Cl.[6] ............................................. B21D 28/00
[52] U.S. Cl. ........................... 72/294; 72/313; 72/334
[58] Field of Search ......................... 72/294, 312, 313, 72/325, 327, 329, 334

[56] References Cited

U.S. PATENT DOCUMENTS

| | | |
|---|---|---|
| 1,270,933 | 7/1918 | Elsener ................................ 72/313 |
| 2,119,663 | 7/1938 | Botts . | |
| 3,022,758 | 2/1962 | Rheingold .......................... 72/327 |
| 3,129,744 | 4/1964 | Payne ................................ 72/327 |
| 4,509,355 | 4/1985 | Oishi . | |

FOREIGN PATENT DOCUMENTS

| | | |
|---|---|---|
| 0336862 | 11/1989 | European Pat. Off. . |
| 2937300 A1 | 3/1980 | Germany . |
| 157530 | 9/1983 | Japan ................................ 72/329 |
| 110429 | 6/1984 | Japan ................................ 72/313 |
| 60141334 | 7/1985 | Japan . |

*Primary Examiner*—Daniel C. Crane
*Attorney, Agent, or Firm*—Rothwell, Figg, Ernst & Kurz, p.c.

[57] ABSTRACT

The invention relates to a punching and forming tool for producing punched and shaped parts from sheets or foils which consist of material which can be deformed by overstretching. The punching and forming tool comprises upper tool carrier plate means and mating punching platemeans, which can be moved with respect to one another, drawing punch means arranged on the underside of the tool carrier plate means, thrust collar means surrounding the drawing punch means, elastic means arranged between the tool carrier plate means and the thrust collar means, a cutting rule means which arranged on the tool carrier plate, extending in the direction of the mating punching plate means and surrounding the thrust collar means, and a recess which is provided in the mating punching plate means and the inner circumferential edge of which is arranged below the end side of the thrust collar.

3 Claims, 1 Drawing Sheet

PUNCHING AND FORMING TOOL

BACKGROUND OF THE INVENTION

1. Field of the Invention

The invention relates to a punching and forming tool for producing punched and shaped parts from sheets or foils which consist of a material which can be deformed by overstretching without changing the temperature.

The punching and forming tool can be used in particular for producing lids for jam jars and yoghurt pots, which lids are punched out of an aluminium foil which is coated with polyethylene or polypropylene.

2. Description of the Related Art

Lids of this kind are conventionally produced by deforming a printed sheet in a first work station and punching the lids out of the printed sheets over their entire circumference by means of punching blades in a second work station.

Thus, in the known art at least two operations which follow one another in time at different locations are required. Furthermore, only three copies are stamped out and deformed in one cycle using the known devices.

SUMMARY OF THE INVENTION

The invention was therefore based on the object of providing a punching and forming tool, using means of simple design, with which a large number of punched and shaped parts can be produced simultaneously with a high cycle time.

This object is achieved by a punching and forming for producing punched and parts from sheets or foils which consist of material which can be deformed by overstretching, comprising upper tool carrier plate means and mating punching plate means, which can be moved with respect to one another, drawing punch means arranged on the underside of the tool carrier plate means, thrust collar means surrounding the drawing punch means, elastic means arranged between the tool carrier plate means and the thrust collar means, cutting rule means arranged on the tool carrier plate means, extending in the direction of the mating punching plate means and surrounding the thrust collar means, and a recess which is provided in the mating punching plate means and the inner circumferential edge of which is arranged below the end side of the thrust collar means, the thrust collar means, the drawing punch means and the cutting rule means being arranged such that in an initial position of the tool carrier plate means the thrust collar means projects further from the tool carrier plate means than the drawing punch means, and the drawing punch projects further from the tool carrier plate means than the cutting rule means, and in a punching position of the tool carrier plate means the thrust collar means presses against the mating punching plate means by means of a spring force exerted by the elastic means, while the elastic means is compressed between thrust collar means and tool carrier plate means, the cutting rule means touches the mating punching plate means and the front end side of the drawing punch means is situated in the recess.

Preferably the elastic means is a rubber ring.

The elastic means can also be formed by compression springs, each of which is supported by one end on the tool holding plate and by the other end on the thrust collar.

The punching and forming tool according to the invention makes it possible to produce punched and shaped parts at high speed and with a high cycle time. Furthermore, a large number of parts can be formed and punched simultaneously, since the spatial requirement of the individual punching and forming devices is low, so that a large number of punching and forming devices can be arranged on one tool carrier plate.

BRIEF DESCRIPTION OF THE DRAWINGS

Exemplary embodiments of the invention are explained in more detail below with reference to the drawings, in which.

DETAILED DESCRIPTION OF THE PREFERRED EMBODIMENTS

Figure 1:
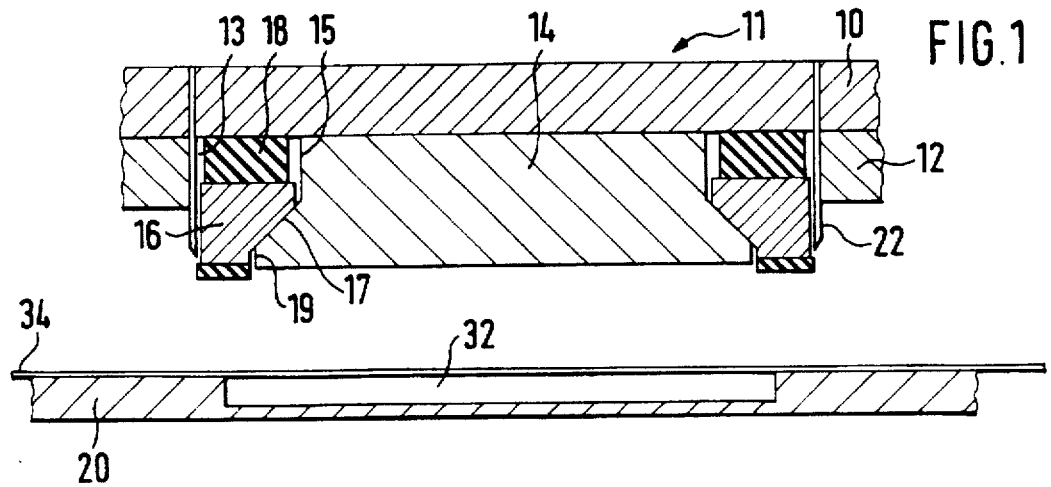
FIG. 1 shows in cross-section a punching and forming device according to the present invention which is used in a punching and forming tool in its initial position.

The punching and forming tool has an upper tool carrier plate 11, which is composed of an upper base plate 10 and a lower base plate 12, which adjoin one another.

A mating punching plate 20 is arranged at a distance from the lower base plate 12.

The punching and forming tool has a plurality of punching and forming devices, one of which is shown in FIGS. 1 to 4 and serves to produce a punched and stamped part with a circular circumference.

A cylindrical, vertically running through-opening 13 is provided in the lower base plate 12. The outer surface of a cylindrical cutting rule 22 bears against the inner circumference of the through-opening 13, which cutting line is fastened to the upper base plate 10 such that it extends downwards, perpendicular to the plane of the base plate 10, beyond the lower base plate 12.

A drawing punch 14 made of aluminium is fastened concentrically inside the through-opening 13 on the underside of the base plate 10, for example by means of a screw and centering pins. The drawing punch 14 has an upper cylindrical section 15, the upper end side of which bears against the underside of the upper base plate 10. Approximately at the level of the underside of the lower base plate 12, the cylindrical section 15 merges into a section 17 which widens conically downwards and ends slightly above the cutting edges of the cutting rule 22. A further cylindrical section 19, which extends further downwards than the cutting edges of the cutting lines 22 and the diameter of which is greater than the diameter of the cylindrical section 15, adjoins the conical section 17.

On the underside of the upper base plate 10, an elastic ring 18 surrounding the cylindrical section 15 and made of rubber or cork is arranged concentrically in the through-opening 13. A thrust collar 16 made of steel, which is likewise arranged concentrically in the through-opening 13, bears against the elastic ring 18 just above the conical section 17. The inner contour of the thrust collar 16 is essentially complementary to the outer contour of the drawing punch 14 in the region between the lower end of the cylindrical section 15 and the lower end of the cylindrical section 19. The outer surface of the thrust collar 16 is cylindrical.

A concentric bolster ring 21, which is made of hard rubber and the outer diameter of which is slightly smaller than the inner diameter of the punching device 22, is arranged at the lower end of the thrust collar 16.

In the initial position shown in FIG. 1, the bolster ring 21 of the thrust collar 16 extends downwards beyond the lower end side of the drawing punch 14, so that its end side is situated below the end side of the drawing punch 14. The difference in height between the bolster ring and the drawing punch 14 is determined as a function of the Shore hardness of the elastic ring 18. By contrast, the difference in height between the cutting edge of the cutting line 22 and the lower end side of the drawing punch 14 is determined as a function of the desired forming depth.

A cylindrical recess 32 is provided in the upper side of the mating punching plate 20, the diameter of which recess is smaller than the outer diameter, and greater than the inner diameter, of the bolster ring 21 of the thrust collar 16.

When the punching device is situated in its initial position shown in FIG. 1, the lower end side of the drawing punch 14 lies above the upper surface of the mating punching plate 20. To produce a stamped shaped part, a printed sheet 34, which consists for example of an aluminium foil which is coated with polyethylene or polypropylene, is introduced into the space between the mating punching plate 20 and the lower base plate 12, such that it rests flat on the surface of the mating punching plate 20.

The upper tool carrier plate 11 is then moved continuously downwards, during which movement first of all the bolster ring 21 of the thrust collar 16 comes into contact with the printed sheet 34 and exerts a contact pressure on the printed sheet 34.

Figure 2:
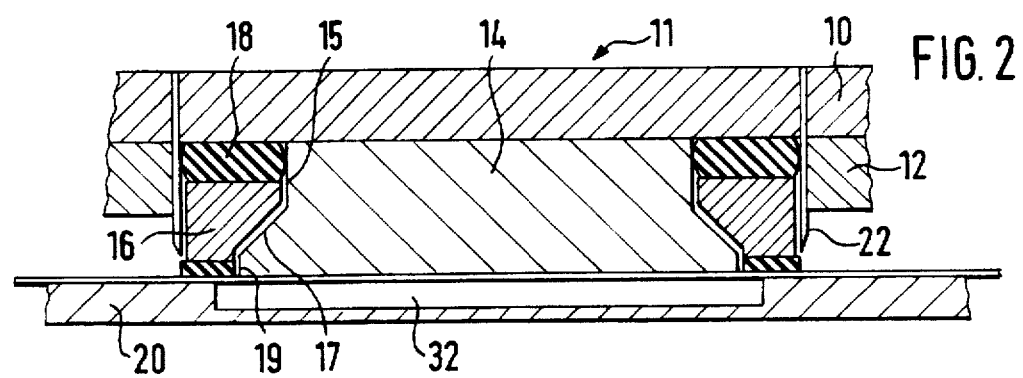
FIG. 2 shows the punching and forming device of FIG. 1 in a second position.

When the tool carrier plate 11 is moved further, the thrust collar 16 is moved further counter to the spring force of the elastic ring 18, so that the latter exerts an increasing downwardly directed pressure on the thrust collar 16, for which reason the printed sheet 34 is held between the surface of the mating punching plate 20 and the lower end side of the bolster ring 21 (FIG. 2).

Figure 4:
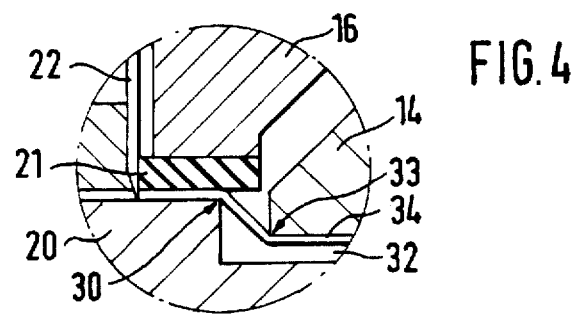
FIG. 4 shows the detail IV of FIG. 3.

Upon subsequent advancement of the tool carrier plate 11, the drawing punch 14 comes into contact with the surface of the printed sheet 34. While the drawing punch 14 moves into the recess 32, the material of the printed sheet 34 is overstretched in the region between the edge 30 of the recess 32 at which the latter merges into the surface of the mating punching plate 20 and the outer circumferential edge 33 of the drawing punch 14 (FIG. 4). The retention force of the thrust collar 16 by means of the elastic ring 18 should be such that the material of the printed sheet 34 cannot migrate in the region between the bolster ring 21 of the thrust collar 16 and the mating punching plate 20, so that after-flow is prevented. The edges 30 and 33 are slightly rounded, in order to avoid the printed sheet 34 tearing as a result of the tensile forces.

Figure 3:
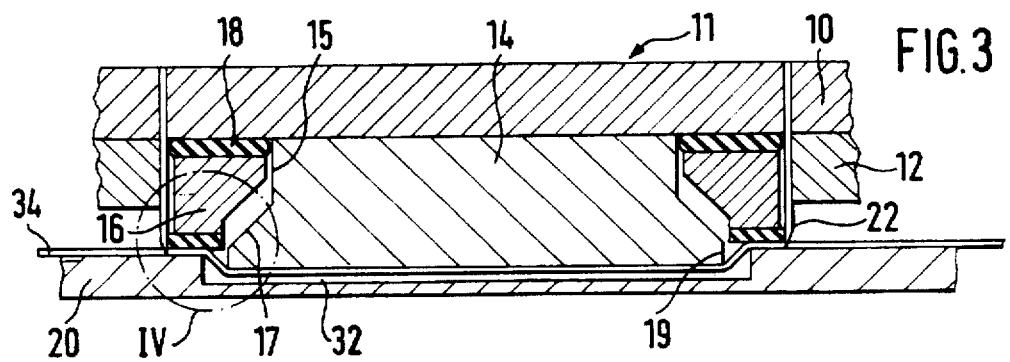
FIG. 3 shows the punching and forming device of FIG. 1 in its cutting position.

The tool carrier plate 11 is finally moved downwards to such an extent that the cutting edge of the cutting rule 22 comes into contact with the mating punching plate 20 and stamps the formed part out of the printed sheet 34 (FIG. 3). In this position, the lower end side of the drawing punch 14 is situated just above the bottom surface of the recess 32.

The shaped part is punched out of the printed sheet 34 such that it remains connected to the rest of the printed sheet 34 only at a few, preferably two, holding points. After punching of the printed sheet 34, the tool holding plate 11 is moved back into its initial position.

A plurality of, for example 80, punching and forming devices, as are shown in FIG. 1, can be arranged simultaneously on the tool carrier plate 11, so that it is possible to produce 80 parts simultaneously with high accuracy in one cycle. The functioning of the punching and forming device has been explained with reference to the production of a stamped shaped part with a circular outer circumference. A stamped shaped part of this kind can for example be a lid for a yoghurt pot or a jam jar. However, it is also possible to use the same technique to produce stamped shaped parts having a very wide range of outer contours, the outer contour of the drawing punch 14, the outer and inner contour of the thrust collar 16 and its bolster ring 21 and the shape of the cutting line 22 generally running essentially parallel to the outer circumference of the stamped shaped part to be produced.

In the exemplary embodiment described, the tool holding plate 11 is moved towards the mating punching plate 20. However, it is equally possible to move the mating punching plate 20 towards the tool holding plate 11.

Furthermore, it is possible to use compression springs, e.g. coil springs, instead of the elastic device 18, the upper end of which springs is accommodated in a bore in the base plate 10 and the other end of which is accommodated in a coaxial bore in the thrust collar 16. The compression springs are distributed uniformly over the circumference of the drawing ring. The number of compression springs depends on the spring force required and on the circumference of the thrust collar 16.

I claim:

1. Punching and forming tool for producing punched and shaped parts from sheets or foils of material which can be deformed by overstretching, comprising upper tool carrier plate means and mating punching plate means, which can be moved with respect to one another, drawing punch means arranged on the under side of the tool carrier plate means and having a front end side facing the mating punching plate means, thrust collar means surrounding the drawing punch means and having an end side facing the mating punching plate means, elastic means arranged between the tool carrier plate means and the thrust collar means so that the thrust collar means is movable relative to the drawing punch means, cutting rule means arranged on the tool carrier plate, extending in the direction of the mating punching plate means and surrounding the thrust collar means, and a recess which is provided in the mating punching plate means and having an inner circumferential edge of which is arranged below the end side of the thrust collar, the thrust collar, the drawing punch and the cutting rule means being arranged such that in an initial position of the tool carrier plate means the thrust collar means projects further from the tool carrier plate means than the drawing punch means, and the drawing punch projects further form the tool carrier plate means than the cutting rule means, and in a punching position of the tool carrier plate means the thrust collar means presses against the mating punching plate means by means of an elastic force exerted by the elastic means, while the elastic means is compressed between thrust collar means and tool carrier plate means, the cutting rule means touches the mating punching plate means and the front end side of the drawing punch means is situated in the recess.

2. Punching and forming tool according to claim 1, wherein the elastic means is a rubber ring.

3. Punching and forming tool according to claim 1, wherein the elastic means is formed by compression springs, each of which is supported by one end on the tool holding plate and by the other end on the thrust collar.

\* \* \* \* \*